No. 895,213. PATENTED AUG. 4, 1908.
W. A. VAN BERKEL.
SLICING MACHINE.
APPLICATION FILED APR. 1, 1904.
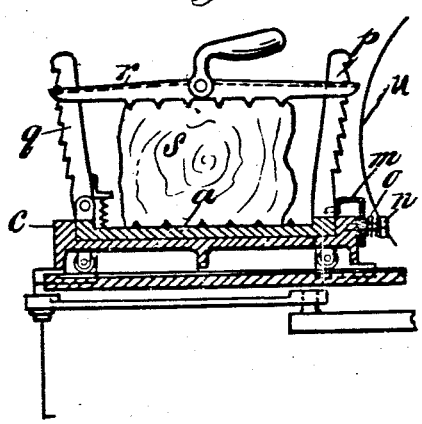
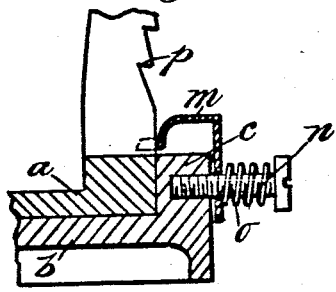
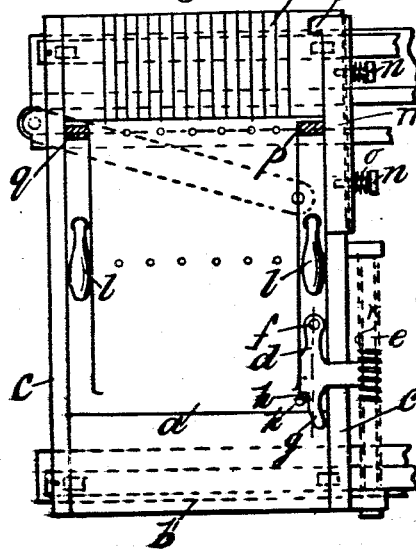
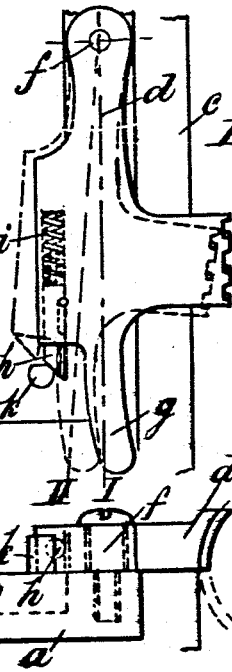
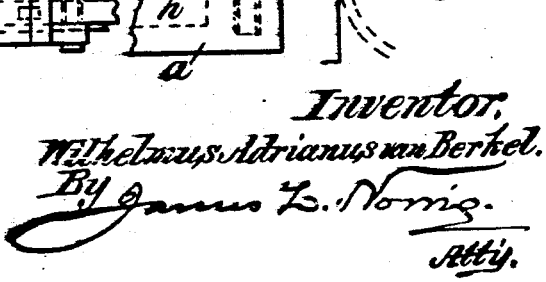

UNITED STATES PATENT OFFICE.

WILHELMUS ADRIANUS VAN BERKEL, OF ROTTERDAM, NETHERLANDS.

SLICING-MACHINE.

No. 895,213.  Specification of Letters Patent.  Patented Aug. 4, 1908.

Application filed April 1, 1904. Serial No. 201,131.

*To all whom it may concern:*

Be it known that I, WILHELMUS ADRIANUS VAN BERKEL, a subject of the Queen of the Netherlands, residing at Rotterdam, Kingdom of the Netherlands, Boezemsingel 56, have invented certain new and useful Improvements in Slicing-Machines, of which the following is a specification.

This invention relates to improvements in slicing machines having a rotary circular knife, to an improved arrangement of the tooth piece for moving forward the plate on which the piece of meat is clamped, and also to a spring mounting of this plate in connection therewith.

These improvements have for their object:—1. To provide a tooth piece which may be brought in a simple manner into and out of engagement with the screw of the shifting mechanism. 2. To give the meat plate a spring mounting so that the play in the screw of the shifting device and also the slight wear and tear of the plate may be automatically compensated for.

A meat slicing machine provided with these improvements is shown in the accompanying drawings, in which, Figure 1 is a cross section; Fig. 2, a plan view of the table; Figs. 3 and 4, sections on an enlarged scale of the spring mounting and the new tooth piece for the shifting mechanism respectively. Fig. 5 is an enlarged detail elevation of a portion of the meat-holding plate and the tooth-feeding piece showing a part of the feeding screw in dotted lines.

The shifting mechanism which provides that the meat plate $a$ is each time moved forward to the thickness of a slice, is arranged at the side of the table $b$ and fixed above on this table. The meat plate $a$ lies quite free between lateral guide bars $c$ on the table $b$.

To the upper side of the plate $a$ near one end thereof is attached a tooth-piece $d$ having teeth adapted to mesh with the threads of a screw $e$ of the shifting mechanism so that when the screw $e$ is turned in the direction indicated by the arrow the plate $a$ is caused to move toward the knife $u$ shown diagrammatically in Fig. 1.

As it would require too much time to bring the piece of meat opposite the knife by turning the screw spindle $e$, or by lifting the meat plate $a$ off the table $b$ and again placing it in the desired position, a mechanism is adopted by means of which the tooth piece $d$ may be brought out of engagement with the screw spindle $e$, the meat plate $a$ being adapted to be moved freely to and fro on the table. For this object the tooth piece $d$ is made pivotal on a point $f$ on the meat table $a$ and provided with a handle $g$ (Figs. 2 and 4) by means of which it may be brought either into the position I in engagement with the screw spindle $e$, or into the position II out of engagement with said screw spindle (Fig. 4).

In order to maintain the tooth piece in one of the two positions, a lock pin $h$ having an oblique edge is provided on the tooth piece. This pin is pressed outwards by means of a spiral spring $i$ and on the plate $a$ a fixed stud $k$ is provided. The lock pin $h$ may be easily pressed back against this stud $k$ by pushing the tooth piece sidewise by the handle $g$ and the same is then held in this position by the pin $h$ resting on a flat part of the stud $k$ (Fig. 4).

By means of the handles $l$ the plate $a$ and the piece of meat $s$ and the clamping device $p\,q\,r$ may be freely displaced on the table $b$, or removed from the same.

The spring action of the locking pin against the fixed stud $k$ presses the tooth piece to the right and in this way assists its engagement in the screw thread of the spindle $e$. In order that any play in the tooth piece $d$ may not make itself felt, a bar $m$ is provided on the right hand guide bar $c$, which bar $m$ is held by two screws $n$ and pressed against the toothed bar $p$ of the clamping device by means of spiral springs $o$. The pressure produced by the bar $m$ allows of the movement of the plate $a$ in one direction and prevents undue play.

A projection $t$ is provided on the end of the bar $m$ which projection limits the movement of the plate $a$. At the same time in this arrangement an automatic adjustment of the plate $a$ between the guide bars $c$ is obtained when by reason of wear the guidance between these bars is less exact.

I declare that what I claim is:—

1. In a meat slicing machine of the class set forth, a table, a meat plate slidably mounted on the table, a screw spindle disposed at one side of the table, a tooth piece pivotally carried by and movable over the plate for engaging the screw spindle, and a resiliently controlled locking means disposed longitudinally in the tooth piece and terminally projecting from the rear extremity of the latter to coöperate with a portion of the plate, the locking means being movable with the tooth piece.

2. In a meat slicing machine of the class set forth, a table, a meat plate slidably mounted on the table, a screw-spindle held at one side of the table, a tooth-piece pivoted at one end of the plate and normally held in engagement with the screw-spindle, said tooth piece having one end free for adjustment and provided with locking means, and resiliently controlled means held by the table and engaging a portion of the plate to compensate for wear of the spindle and the tooth-piece.

3. In a meat slicing machine of the class set forth, a table, a meat plate slidably mounted on the table, a screw spindle disposed at one side of the table, a tooth piece pivotally connected at its forward extremity to the table and having a longitudinally extending locking pin therein and projecting from the rear extremity thereof, the tooth piece also having a toothed projection normally held in engagement with the screw spindle and a rearwardly extending handle adjacent to the rear terminal of the locking pin, and a projecting device on one side of the plate with which the said locking pin engages.

4. In a meat slicing machine of the class set forth, a table, a meat plate slidably mounted on said table, a screw spindle disposed at one side of the table, means pivotally carried by and movable over the plate for engaging the screw spindle, and resiliently-controlled means held by the table and engaging a portion of the plate to compensate for wear of the spindle and the aforesaid means.

5. In a meat slicing machine of the class set forth, a table, a meat plate slidably mounted on said table, a screw-spindle disposed at one side of the table, a tooth piece pivotally secured to and movable horizontally over the plate and normally held in engagement with the spindle, said tooth piece having means for moving the same, a locking pin held by the tooth piece adjacent to the free extremity of the latter and having a projecting head, a stud on the table against which said head has bearing, and resiliently controlled means held by the table for compensating for wear and taking up play between the spindle and tooth piece.

6. In a meat slicing machine of the class set forth, a table, a meat plate slidably mounted on the table, a screw spindle disposed at one side of the table, a tooth piece pivotally connected at one end to and movable horizontally over one side of the plate and normally held in engagement with the screw spindle, the opposite end of the tooth piece being free for movement, a lock pin disposed in the free end of the tooth piece, a fixed stud carried by the plate for engagement with the said lock pin, and means carried by the table for compensating for play and wear between the spindle and the tooth piece.

7. In a meat slicing machine of the class set forth, a table, a meat plate slidably mounted on the table, a screw spindle arranged at one side of the table, a toothed means pivotally mounted on and movable with the plate and held in engagement with the screw spindle during the feeding movement of the plate, an upstanding bar secured to one side of the table near one end, and resilient devices engaging a portion of the said bar to permit the latter to yield, the bar having bearing against one side of the plate.

8. In slicing machines, the combination with the rotary knife and its driving mechanism, of a supporting slide having means for clamping the meat thereto, guides wherein said slide is mounted, feed mechanism for said slide, and an upright spring held frame at one of the side edges of the slide, and arranged to press the same laterally against its guide to automatically take up lateral play and wear, substantially as described.

9. In slicing machines, the combination with the knife, the traveling carriage and drive mechanism for said knife and carriage, of a supporting slide for the material moving in guides on said carriage, and a spring device interposed between said carriage and slide and pressing said slide laterally to automatically take up loose play and wear between said parts, substantially as described.

10. In slicing machines, the combination with a knife, a traveling carriage and drive mechanism for said knife and said carriage, of a supporting slide having means for clamping the material thereto moving in guides on said carriage, and a spring held member mounted on the carriage and pressing laterally against said slide to automatically take up the lateral play between the slide and its guides, substantially as described.

In testimony whereof I have hereunto set my hand in presence of two subscribing witnesses.

WILHELMUS ADRIANUS VAN BERKEL.

Witnesses:
WILLIAM JACOBUS DE GRAAF,
BERNARDUS VAN DE BERGH.